United States Patent Office 3,324,037
Patented June 6, 1967

3,324,037
THIXOTROPIC ETHYLENEDIAMINE-BASED PAINT STRIPPERS
Myer Rosenfeld, Baltimore, Md., assignor to the United States of America as represented by the Secretary of the Army
No Drawing. Filed July 2, 1964, Ser. No. 380,099
4 Claims. (Cl. 252—120)

The invention described herein may be manufactured and used by or for the Government of the United States for governmental purposes, without the payment to me of any royalty thereon.

This invention relates to novel thixotropic compositions of matter useful as paint-stripping agents or strippers.

In my copending applications, filed on even date herewith, essentially two-component ethylenediamine-based paint stripping compositions are disclosed:

Application Ser. No. 380,098 pertains to an ethylenediamine (EDA) paint stripper in which N,N-dimethylformamide (DMF) is disclosed as the second component therewith;

Application Ser. No. 380,100 pertains to an ethylenediamine (EDA) paint stripper in which tetrahydrofuran (TNF) is disclosed as the second component therewith, and Application Ser. No. 380,101 pertains to an ethylenediamine (EDA) paint stripper in which anisole is used as the second component therewith. The three compositions of the copending applications are very effective paint strippers but have the disadvantage that they are liquid at the usual, i.e., ambient, temperatures at which they are employed. The workpieces to be stripped of paint are thus generally dipped in the stripping solution. The dipping procedure becomes undesirable as the size of the workpiece increases because of the bulk of the liquid, the requisite containing tanks, and so forth.

Therefore, it is the principal object of this invention to provide suitably thickened paint-stripping compositions which retain the desirable qualities of the ethylenediamine-based strippers of the above-mentioned copending applications but which need not be applied by a dipping procedure. The process for making and using thixotropic mixtures are other objects of the invention.

The above-mentioned and other objects are achieved in accordance with this invention by providing thixotropic compositions containing ethylenediamine and a second component which consists of either N,N-dimethylformamide, tetrahydrofuran or anisole together with the three components that form the thixotropic agent of the present invention, said components consisting essentially of ethylenediamine oleate, ethylenediamine palmitate and calcium stearate.

The present compositions contain ethylenediamine and the second component therewith in volume ratios as in the respective copending applications, i.e., ethylenediamine:N,N-dimethylformamide in the range 50:50–10:90, ethylenediamine:tetrahydrofuran in the range 30:70– 70:30 and ethylenediamine:anisole in the range 90:10– 38:62. Conventional stabilizers, e.g. 0.1% by weight of hydroquinone with tetrahydrofuran be included therein.

The three-component thixotropic agent added to these mixtures is generally made up in practice from preformed calcium stearate and palmitic and oleic acids reacted in situ with ethylene diamine calculated to keep constant the ratio of ethylenediamine to the second active component (DMF, TNF or anisole) in the paint stripper. For each hundred milliliters of paint stripper there are required, in general, about 2.8–4.8 g. of palmitic acid, about 4.7–7.2 ml. of oleic acid (about 0.37–0.64 g.), enough excess ethylenediamine on a 1:1 molar basis to neutralize the acids, and about 2.8–4.8 g. of calcium stearate. Details appear in the examples below.

The compositions of this invention are considered genuinely thixotropic. An apparent gel when they are formed, they are converted by agitation into a fluid that can be applied to a painted workpiece by any suitable means. They then become rigid with sufficient rapidity to adhere to the surface, even if vertical, without appreciable loss of liquid stripper. The paint stripper proceeds to remove or soften the paint as it does in the absence of the thixotropic agent.

In the practice of the invention, painted surfaces are stripped by applying the compositions in fluid form to the workpiece, in a vertical position if desired, and maintaining contact at ambient temperature. The time of contact required will vary with the paint, its age and thickness, etc., but will usually not exceed an hour if it is to be removed by scrubbing as with steel wool. If the paint is to be removed solely by hosing with water, contact times of up to six hours may be necessary.

All chemicals used in this invention can be of commercial grade.

There follow some examples illustrative of the invention. In these examples, all temperatures are ambient and all proportions and percentages by volume unless otherwise indicated.

*Examples 1–20*

A series of runs was made to test the effect of the thixotropic agent of this invention on ethylenediamine-based paint stripper.

Ethylenediamine was added to various preformed stripping compositions in amounts sufficient to effect conversion of oleic and palmitic acids to the ethylenediamine soaps without altering the original percentage of ethylenediamine in the stripper. The stripper containing excess ethylenediamine was then added to premixed palmitic and oleic acids in calculated quantity and the resultant mixture warmed gently until all soaps were in solution. The warm mix was added to the calcium stearate and agitated to disperse the latter. Mixtures at room temperature can be used with additional agitation.

The table which follows details compositions found to be satisfactory in thixotropic character and in paint-stripping efficiency.

TABLE

| Example No. | Paint Stripper Components Relative volume present in stripper | | | | Thixotropic agents, amount per 100 ml. paint stripper | | | |
|---|---|---|---|---|---|---|---|---|
| | Anisole | TNF | DMF | EDA | Neutralizer: EDA | Palmitic Acid (g.) | Oleic Acid (ml.) | Calcium Stearate (g.) |
| 1 | 62 | | | 38 | 2.3 | 4.0 | 6.0 | 4.0 |
| 2 | 62 | | | 38 | 2.75 | 4.8 | 7.2 | 4.8 |
| 3 | 62 | | | 38 | 1.61 | 2.8 | 4.2 | 2.8 |
| 4 | 50 | | | 50 | 2.3 | 4.0 | 6.0 | 4.0 |
| 5 | 50 | | | 50 | 2.75 | 4.8 | 7.2 | 4.8 |
| 6 | 50 | | | 50 | 1.61 | 2.8 | 4.2 | 2.8 |
| 7 | 10 | | | 90 | 2.3 | 4.0 | 6.0 | 4.0 |
| 8 | 10 | | | 90 | 2.75 | 4.8 | 7.2 | 4.8 |
| 9 | 10 | | | 90 | 1.61 | 2.8 | 4.2 | 2.8 |
| 10 | | 35 | | 65 | 2.3 | 4.0 | 6.0 | 4.0 |
| 11 | | 35 | | 65 | 2.75 | 4.8 | 7.2 | 4.8 |
| 12 | | 35 | | 65 | 1.61 | 2.8 | 4.2 | 2.8 |
| 13 | | 50 | | 50 | 2.3 | 4.0 | 6.0 | 4.0 |
| 14 | | 50 | | 50 | 2.75 | 4.8 | 7.2 | 4.8 |
| 15 | | 50 | | 50 | 1.61 | 2.8 | 4.2 | 2.8 |
| 16 | | 65 | | 35 | 2.3 | 4.0 | 6.0 | 4.0 |
| 17 | | 65 | | 35 | 2.75 | 4.8 | 7.2 | 4.8 |
| 18 | | 65 | | 35 | 1.61 | 2.8 | 4.2 | 2.8 |
| 19 | | | 53.6 | 46.4 | 2.3 | 4.0 | 6.0 | 4.0 |
| 20 | | | 80 | 20 | 2.3 | 4.0 | 6.0 | 4.0 |

It was found that in Examples 9 and 19 the thickened portion initially floated, but gelation occurred on standing overnight (about 18 hours). Upon reagitation, the more fluid bottom portion was incorporated into the whole, which became and remained homogeneously thixotropic. In all cases described, true gels appeared to be produced since a thin layer of fluid surrounding the entire gel was formed, a characteristic of syneresis.

When each of the compositions listed above was applied to a baked ethylenediamine-cured epoxy paint on an anodized magnesium base, it was found to remove the paint or to soften it within a few minutes so that it could readily be removed with steel wool (see my copending application mentioned above).

It can be seen from the table that, in general, for each 100 ml. of paint stripper, palmitic acid used to form the ethylenediamine palmitate varies from 2.8 to 4.0 grams, oleic acid used to form the ethylenediamine oleate varies from 4.2 to 7.2 milliliters (room temperature; about 0.37–0.64 g.) and calcium stearate varies from 2.8 to 4.8 grams.

Having now described my invention.

I claim:

1. A thixotropic, ethylenediamine-based paint-stripping composition consisting essentially of:

ethylenediamine a second component selected from the group consisting of

N,N-dimethylformamide
   tetrahydrofuran
   anisole in which said ethylenediamine:N,N-dimethylformamide volume ratio being in the range of 50:50–10:90, respectively, said ethylenediamine:tetrahydrofuran volume ratio being in the range of 30:70–70:30, respectively, and said ethylenediamine:anisole volume ratio being in the range of 90:10–38:62, respectively, and a thixotropic agent formed in said ethylenediamine and said second component mixture, said agent consisting essentially, per 100 milliliters of said mixture, of from about 2.8 to 4.0 grams of palmitic acid, of from about 0.37 to 0.64 grams of oleic acid, an equimolar amount of ethylenediamine sufficient to neutralize said palmitic and said oleic acids, and from about 2.8 to 4.8 grams of calcium stearate.

2. A composition as in claim 1 wherein the second component is anisole in the volume ratio recited therein.

3. A composition as in claim 1 wherein the second component is tetrahydrofuran in the volume ratio recited therein.

4. A composition as in claim 1 wherein the second component is N,N-dimethylformamide in the volume ratio recited therein.

References Cited

UNITED STATES PATENTS

| 2,443,173 | 6/1948 | Baum et al. | 252—127 |
| 2,509,197 | 5/1950 | Borus et al. | 252—118 |
| 2,587,777 | 3/1952 | Smith | 252—118 XR |
| 2,990,391 | 6/1961 | Grantham | 252—364 XR |
| 3,173,876 | 3/1965 | Zebrist | 252—153 XR |
| 3,179,609 | 4/1965 | Morison | 134—38 |

OTHER REFERENCES

The Condensed Chemical Dictionary—4th Ed. (1950), Reinhold Publishing Corp. pp. 132, 55, 240 and 653.

LEON D. ROSDOL, *Primary Examiner.*

W. E. SCHULZ, *Assistant Examiner.*